Figure 1:
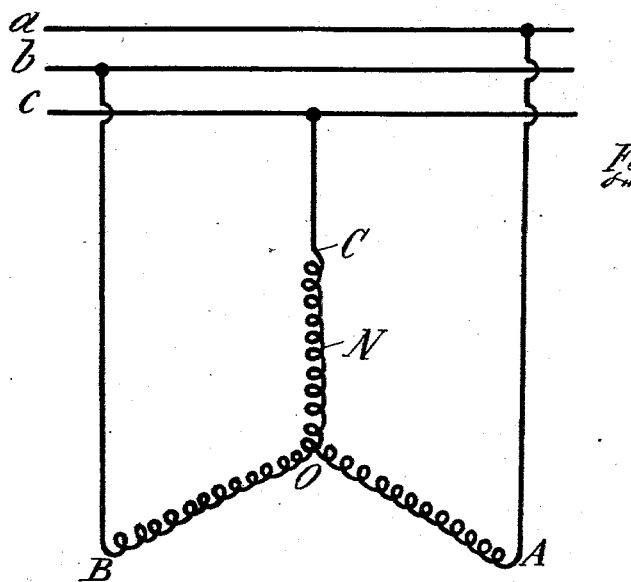

No. 746,775. PATENTED DEC. 15, 1903.
R. ARNO.
PRODUCING APPROPRIATE PHASE RELATIONSHIP IN ALTERNATING
CURRENT MEASURING OR OTHER DEVICES.
APPLICATION FILED FEB. 8, 1900.
NO MODEL. 2 SHEETS—SHEET 1.

No. 746,775. PATENTED DEC. 15, 1903.
R. ARNO.
PRODUCING APPROPRIATE PHASE RELATIONSHIP IN ALTERNATING CURRENT MEASURING OR OTHER DEVICES.
APPLICATION FILED FEB. 8, 1900.
NO MODEL. 2 SHEETS—SHEET 2.
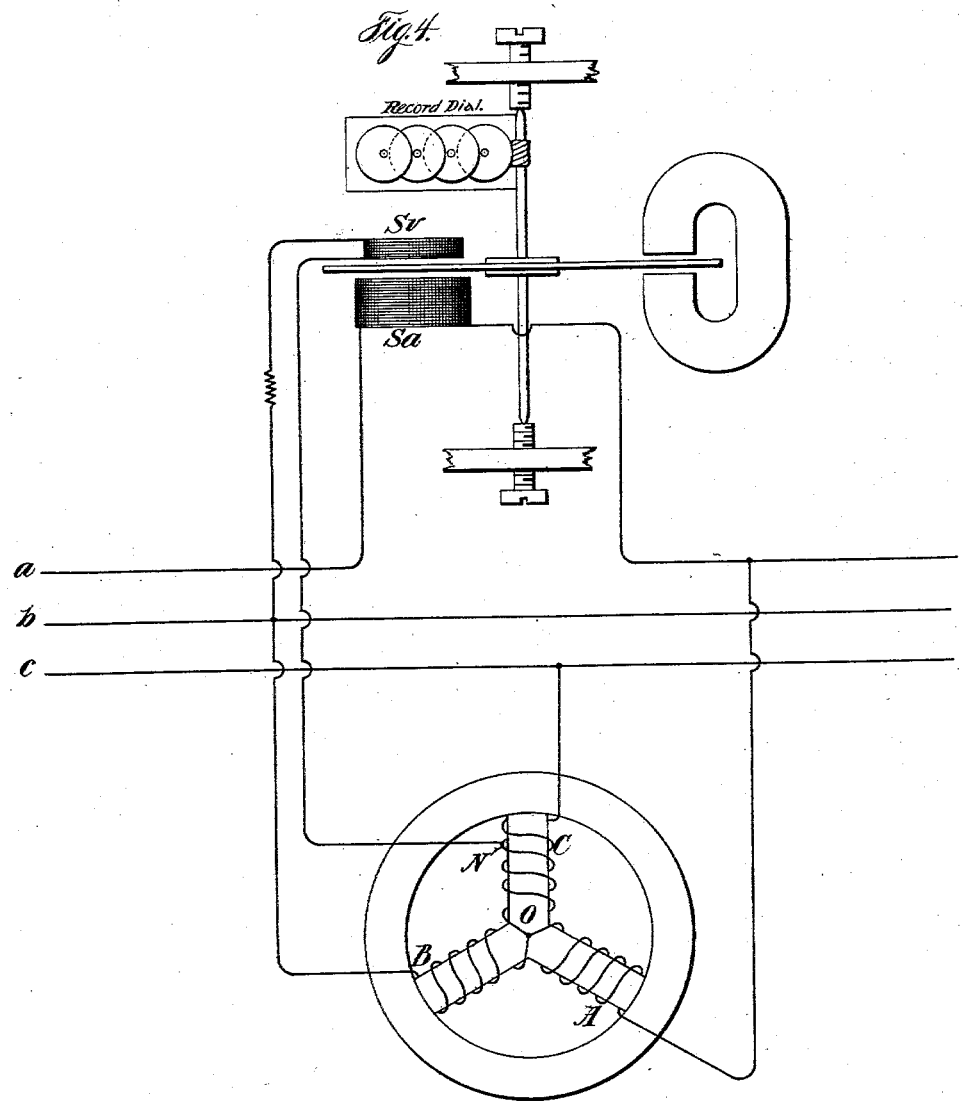
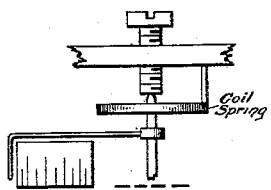

No. 746,775. Patented December 15, 1903.

UNITED STATES PATENT OFFICE.

RICCARDO ARNO, OF MILAN, ITALY.

PRODUCING APPROPRIATE PHASE RELATIONSHIP IN ALTERNATING-CURRENT MEASURING OR OTHER DEVICES.

SPECIFICATION forming part of Letters Patent No. 746,775, dated December 15, 1903.

Application filed February 8, 1900. Serial No. 4,515. (No model.)

*To all whom it may concern:*

Be it known that I, RICCARDO ARNO, a subject of the King of Italy, residing at Milan, in the Kingdom of Italy, have invented certain new and useful Improvements Relating to Producing Appropriate Phase Relationships in Alternating-Current Measuring or other Devices; and I hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to the measurement of energy and the consumption of power in polyphase systems, especially three-phase systems of electrical distribution, and particularly in such systems which are balanced or symmetrically loaded. In systems of this latter description, as is well known, it is possible to measure the energy and power by means of a single instrument, an indicating or a recording wattmeter having a movable part arranged in operative relation to a current-coil connected in series with one of the mains of the system and a potential-coil of comparatively fine wire connected across the other two mains.

As is well known in the art, alternating-current energy-measuring instruments or wattmeters are of various types, one type consisting in an instrument having two coils or two sets of coils, in one of which coils or sets of coils the current varies with differences of potential and in the other coil or sets of coils with variation of current, one of these coils or sets of coils being movable and the other fixed, the movable coil or sets of coils being either oscillatory or rotary. Another type of alternating-current wattmeter is the so-called "rotary-field" type, and in this type this invention is particularly useful. In the rotary-field type of alternating-current wattmeter the two coils or sets of coils coact in producing a rotary field, and therefore the current in one of these coils or sets of coils must be displaced in phase from the current in the other coil or sets of coils by appropriate phase angle to produce a uniform and constant rotary field. In this type of apparatus it is difficult to obtain the exact proper phase relationship between the current in the current-coil and that in the potential-coil, upon which the reliability and accuracy of the results largely depend. Many methods and devices have heretofore been proposed for adjusting this phase relationship, none of which possesses the novel features and advantages which characterize my invention.

To obtain the desired phase relationship between the different coils or sets of coils of the wattmeter, I employ an autotransformer or reaction-coil, with its windings connected one to each of the multiphase mains, and to this autotransformer are connected the terminals of the potential-coils of a wattmeter in such a way that its phase relationship to the current-coil is determined by the conjoint effect of two of the windings on the autotransformer so related as to their turns as to conjointly produce in the potential-coil the desired phase relationship with respect to the current-coil.

As in the system above mentioned it is desirable that the differences in phase between the electromotive forces in the current-coil and potential-coil of the measuring instrument should be exactly ninety degrees, I shall describe my invention as designed to produce that relationship; but it will be understood that the invention is equally applicable to other systems and to produce other relationships with but slight modification.

An embodiment of my invention is illustrated in the accompanying drawings, in which like reference characters indicate corresponding parts throughout the several figures, and in the drawings—

Figure 2:
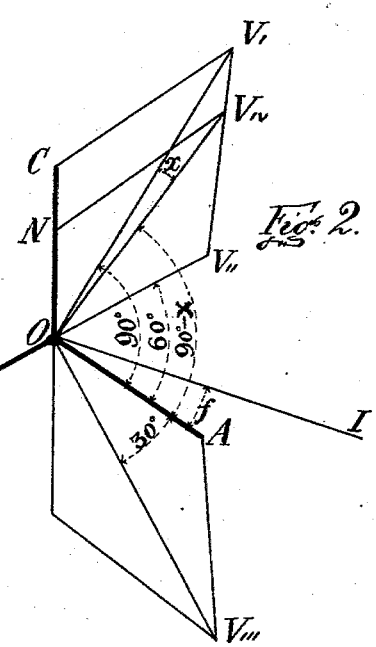
Figure 3:
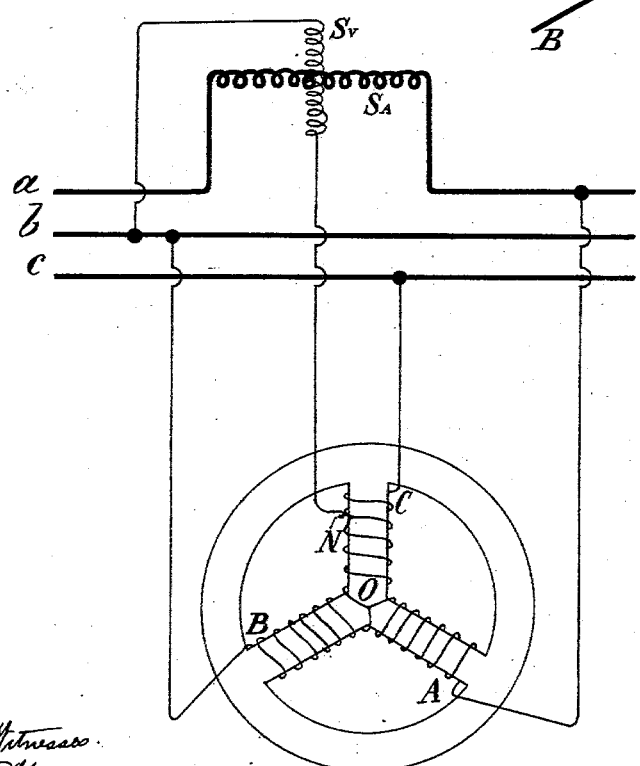

Figure 1 represents the three mains of a three-phase system symmetrically loaded, the coils O A, O B, O C, in which the power is absorbed, being joined to a common junction O, from which they branch starwise, each to its own line. Fig. 2 is a diagram of phase differences. Fig. 3 shows diagrammatically the coils of a wattmeter connected to the mains of a three-phase system and equipped and constructed according to my invention for producing the proper phase relationship. Fig. 4 shows my invention as applied to a recording-wattmeter; and Fig. 5 is a detail showing a modification of the recording mechanism to an indicating mechanism, converting the meter into an indicating-wattmeter.

The following considerations apply without any restriction whatever to the case of star groupings: 1. That the difference of potential V, Fig. 2, between the points O and A is in advance by ninety degrees with respect to the difference of potential $V^I$ between B and C, the angle of lead being ninety degrees. 2. The difference of potential V between O and A leads in phase with respect to the difference of potential $V^{II}$ between B and O (reversed,) the angle of lead being sixty degrees. 3. The difference of potential V leads in phase with respect to the difference of potential $V^{IV}$ existing between the points B and N, N being a point situated between C and O. The angle of lead is greater than sixty degrees and cannot exceed ninety degrees; but it approaches ninety degrees the nearer N is to C and exceeds sixty degrees but slightly if N is near O.

Suppose I and I' to be the effective value of two currents showing a phase difference of of $f$ degrees between each other. If these currents flow through the inducing-coils of a rotary-field induction apparatus, the induced coil will turn through $d$ degrees according to the equation $I\ I'\ \sin. f = H\ d$, wherein H is a constant quantity.

If one of the two inducing-coils of the apparatus be used to measure the amperes and the other one the volts and if V be the alternate effective potential difference existing between the ends of the coil measuring the volts, C being a constant, the following equation subsists: $V\ I\ \sin. (f - x) = C\ d$, $x$ being the lag of phase of current I', which flows through volt-measuring coil behind the potential difference between the ends of the said coil, depending on the inductance of said coil.

Suppose now the ampere-measuring coil to be inserted into one of the three mains $a\ b\ c$ of the system—for instance, into $a$—and the volt-measuring coil to be shunted between $b$ and $c$, as indicated in Fig. 3. Then owing to the property set forth under 1 we shall have $V\ I\ \sin. (90° - f + x) = K\ d$, K being a constant, which equation in the case of $x$ being so small as to allow of its being neglected may be written $V\ I\ \cos. f = K\ d. =$ Watts. This equation shows how a rotary-field-induction apparatus may be utilized for the purpose of measuring the power developed or absorbed in one of the branches of the star grouping.

If instead of availing ourselves of the difference of potential $V^I$ between the mains $b$ and $c$ the difference of potential $V^{IV}$ between the points B and N of the star grouping O A, O B, O C is resorted to, N being so chosen as to cause the difference of potential V between O and A to lead in phase with respect to $V^{IV}$ an angle of ninety degrees—$x$, we obtain:

$$V\ I\ \sin. (90° - x - f + x) =$$
$$V\ I\ \cos. f = K\ d. = \text{Watts} = W$$

K being a constant and W the exact measure of the power absorbed or developed in one of the branches of the star grouping.

The point N may easily be obtained in practice by means of the auxiliary apparatus O A, O B, O C, Fig. 3, in the form of a reaction-coil for three-phase systems and connected with a three-phase circuit without inductive resistance—for example, a circuit for feeding incandescent lamps. In this case $$\left. \begin{array}{l} f = 0 \\ \cos. f = 1 \\ W = VI \end{array} \right\} \text{for each of the branches,}$$

and $W = 3^{VI}$ for the whole system. These quantities can be measured by any suitable standard instrument for measuring V and I, and the position of the point N for the connection may then be ascertained by displacing said point by way of trial several times in the direction of the arm O C of the star-shaped reaction-coil O A, O B, O C until it indicates the measure W. These measurements are verified by means of the rotary-field induction apparatus (indicating-wattmeter) and the rotary-field induction-meter, (recording-wattmeter,) and if the value of W in both is the same or leads to the same result the position N is correctly found.

It appears from the above that a rotary-field-induction apparatus, one of whose inducing-coils measures the current, while the other one measures the potential difference, may be used as an indicating-wattmeter (see Fig. 5 in connection with Fig. 4) for the exact measurement of power in three-phase systems symmetrically loaded.

The above considerations apply not only to the measurement of the power—i. e., of the rate of doing work—but also to the measurement of the work or energy itself, and on the basis thereof a rotary-field-induction motor can be used as an energy or supply meter, known as a "recording-wattmeter," for exactly recording the work absorbed in three-phase systems symmetrically loaded.

The conditions to be fulfilled are as follows: First, the inductance of the small rotary field-motor or recording-wattmeter must be very small, such as may be obtained by convenient arrangement of the armature itself as well as by dispensing with iron in its construction; second, the revolution of the armature must be opposed by a resistance proportional to the square of the revolving speed, friction being left out of consideration, such resistance being easily obtainable through the eddy-currents produced in an aluminium or copper disk put in motion between the pole-pieces of magnets.

For a wattmeter the aluminium or copper retarding-disk in an ordinary rotary-field induction-motor is removed and a spring substituted in lieu thereof. The main shaft instead of continuously revolving will then only turn through such an angle as allowed by the tension of the spring, such an angle being at any given instant dependent on the momentary value of the energy developed or absorbed by the three-phase system. If now upon the said main shaft a pointer is fixed and under the pointer a dial with proper scale and the recording mechanism of the meter be removed, as shown in Fig. 5, instead of a meter—viz., watt hour-meter—a wattmeter is formed, measuring the rate of doing work at any given instant—i. e., the power.

While I have described specifically an embodiment of my invention, I do not wish to be understood as thereby limiting the scope of the principles involved; but, on the contrary, I would have it known that I contemplate the application of the invention to all apparatus and systems now known or hereafter to be devised to which the principles involved may be or become applicable. Moreover, while I have introduced certain formulæ into this specification to explain theoretically certain working conditions, I do not wish to be bound strictly by such demonstration, but rather prefer to have the exposition in the specification and drawings, taken as a whole, broadly interpreted.

Having thus described my said invention, what I claim as new therein, and desire to secure by Letters Patent, is—

1. The method of producing the proper phase relationship between the currents flowing in the inducing-coils of a rotary-field motive device which consists in energizing one of the sets of inducing-coils of said device with the current flowing in one of the multiphase mains and energizing the other set or sets of inducing-coils by a current due to the properly relatively proportioned amount of electromotive forces derived from currents flowing in the other mains of the multiphase system acting through magnetic media.

2. In a rotary-field motive device, the method of obtaining the proper phase relationship between the currents flowing in the actuating-coils which consists in subjecting the currents flowing in one or more of said coils to the properly-proportioned conjoint action of currents flowing in the windings of an autotransformer or reaction coil connected in operative relation to the mains of a polyphase system of electrical distribution.

3. In a rotary-field motive device, the method of obtaining the proper phase relationship between the currents flowing in the actuating-coils which consists in connecting one of said coils directly in one of the mains and subjecting the current flowing in another coil to the conjoint action of currents flowing in windings of an autotransformer or reaction coil connected to the mains of a polyphase system of electrical distribution.

In testimony whereof I affix my signature in presence of two witnesses.

RICCARDO ARNO.

Witnesses:
GIACOMO GUARNIERI,
VIRGINIO CARNEVALI.